United States Patent
Cho

Patent Number: 5,959,681
Date of Patent: Sep. 28, 1999

[54] MOTION PICTURE DETECTING METHOD

[75] Inventor: Yong-Hun Cho, Seoul, Rep. of Korea

[73] Assignee: Samsung Electronics Co., Ltd., Kyungki-do, Rep. of Korea

[21] Appl. No.: 08/774,493

[22] Filed: Dec. 30, 1996

[30] Foreign Application Priority Data

Dec. 30, 1995 [KR] Rep. of Korea ............ 95-67758

[51] Int. Cl.$^6$ ............... H04N 7/01; H04N 11/20
[52] U.S. Cl. ............ 348/452; 348/448; 348/451; 348/458
[58] Field of Search ............ 348/448, 451, 348/452, 458, 447, 699, 700, 701, 208; 382/266, 107; H04N 7/01, 11/20

[56] References Cited

U.S. PATENT DOCUMENTS

| | | | |
|---|---|---|---|
| 5,025,495 | 6/1991 | Avis | 348/452 |
| 5,208,667 | 5/1993 | Saunders | 348/452 |
| 5,475,438 | 12/1995 | Bretl | 348/452 |
| 5,521,644 | 5/1996 | Sezan et al. | 348/452 |

*Primary Examiner*—Andrew I. Faile
*Assistant Examiner*—Vivek Srivastava
*Attorney, Agent, or Firm*—Sughrue, Mion, Zinn, Macpeak & Seas, PLLC

[57] ABSTRACT

A method of accurately detecting rapid motion as well as slow motion using two field memories in an interlaced-progressive scanning converter for changing an interlaced-scanned signal into a progressive-scanned signal. A threshold coefficient, which is used for comparison to a difference between temporal interpolation and spatial interpolation values to determine whether a picture is in motion, is determined dynamically in the disclosed method, rather than being a fixed, predetermined value. The threshold coefficient is determined based upon a degree of correlation between data of pixels above and below a pixel to be interpolated. Detection of whether the picture is stationary is based upon the difference between the data of pixels above and below the pixel to be interpolated is greater than a stationary coefficient. The threshold coefficient is maintained as being no less than the value of the stationary coefficient.

7 Claims, 2 Drawing Sheets

MOTION PICTURE DETECTING METHOD

BACKGROUND OF THE INVENTION

1. Field of the Invention

This invention relates to a method of detecting a motion picture (as opposed to a still picture) in an interlaced-progressive scanning converter. Specifically, it relates to a method of detecting a rapid movement at a slight error, using the correlation between pixels above and below a pixel to be interpolated. The present application is based upon Korean Application No. 67758/1995, which is incorporated herein by reference.

2. Description of the Related Art

Conventionally, an interlaced-progressive scanning converter indicates an apparatus for changing an interlaced-scanned signal into a progressive-scanned signal. Such interlaced-progressive scanning converter is a signal processing unit for preventing the deterioration of vertical resolution, flicker of a scanning line, and flicker of a broader area which are caused by a conventional television system's interlaced scanning. There are several methods used, such as a dual scanning, an interpolation using two neighboring scanning lines, and a repetition of the value of a field just before the present field. Picture quality can also be improved by using a motion compensating method.

A general interlaced-progressive scanning converter has a structure shown in FIG. 1. As shown in FIG. 1, a motion picture detecting unit 110 detects a motion picture after comparing the pixels above and below a pixel to be interpolated in a field which is being scanned, or after comparing a previously scanned field and a field which will be scanned next. Field memories 112 and 114 temporarily store one field of picture signal externally input through a video input port and buffer it according to the order of input of the data. An interpolation circuit 116 interpolates the picture signal which will be scanned in units of a pixel, under the control of the motion picture detecting unit 110.

In FIG. 2, characters X, A, and B each represent pixels of the field being presently scanned. X is the pixel which will be interpolated. A and B are the pixels above and below, respectively, the pixel to be interpolated. C represents the pixel of the previously scanned field, and D represents the pixel of the field which will be scanned after the present field, C and D both being located at positions in their respective fields corresponding to the field position of pixel X. One frame is composed of two fields, so that C and D do not belong to the same frame.

With reference to FIGS. 1 and 2, a conventional interpolation after detecting the motion picture will be explained below.

Pixels A, B, C, and D shown in FIG. 2 are utilized for interpolating pixel X. The method using pixels A, B, C, and D can be described, using the following formulas. If |C−D|, that is, the difference between the preceding and succeeding frames, is smaller than a first threshold th1, it is decided that there is no movement between frames. If the difference between a value $$\frac{C+D}{2}$$

in case of temporal interpolation and a value $$\frac{A+B}{2}$$

in case of spatial interpolation is smaller than th2, it is decided that there is no movement between fields. In other words, if the differences between the present field value $$\frac{A+B}{2}$$

and the preceding or succeeding field value $$\frac{C+D}{2}$$

are respectively are smaller than a second threshold th2, it is decided that there is no movement between fields. Consequently, a picture is judged to be a stationary picture if the first and second formulas below are met.

$$|C - D| < th1 \text{ (first formula)}$$

$$\left|\frac{C+D}{2} - \frac{A+B}{2}\right| < th2 \text{ (second formula)}$$

Generally, th1 and th2 are determined when products are manufactured. They represent decision coefficients which are standards for detecting the motion picture.

When the picture is detected to be in motion by using the above formulas, the interpolation is performed by a method of $$\frac{A+B}{2}$$

using the pixels A and B in the same field.

When the picture is detected to be stationary by using the above formulas, the interpolation is performed with C, D or $$\frac{C+D}{2},$$

using the preceding field pixel C and the succeeding field pixel D.

In the above detecting methods, the decision coefficient th2 is generally established as being larger than th1. The established decision coefficient th2 is a fixed value, which makes it difficult to properly distinguish the movement between fields. If the decision coefficient th2 is established as a small value, too many stationary pictures are judged as being motion pictures. If the decision coefficient th2 is established as too large a value, it is difficult to accurately distinguish the movement between fields, so that a problem of motion blurring occurs in a finally interpolated picture.

SUMMARY OF THE INVENTION

Accordingly, an object of the present invention is to provide a method of accurately detecting rapid motion as well as slow motion in motion picture signals, using two field memories.

To achieve the object of the present invention, a method of detecting whether a picture is in motion in an interlaced-progressive scanning converter for changing an interlaced-scanned signal into a progressive-scanned signal, includes the steps of:

(a) A motion picture is detected after comparing a difference between pixel data of fields preceding and succeeding a field to be interpolated with a first decision coefficient established upon manufacturing.

(b) A second decision coefficient is set according to the degree of correlation between data of pixels above and below a pixel to be interpolated.

(c) A motion picture is detected after comparing a difference between temporal interpolation and spatial interpolation with the second decision coefficient.

(d) A stationary picture is detected in the case that the difference between the data of pixels above and below the pixel to be interpolated is greater than the stationary coefficient.

(e) The second decision coefficient is maintained at a predetermined value greater than over the stationary coefficient.

BRIEF DESCRIPTION OF THE DRAWINGS

A more complete appreciation of this invention, and many of the attendant advantages thereof, will be readily apparent by reference to the following detailed description when considered in conjunction with the accompanying drawings, in which like reference symbols indicate the same or similar components, wherein.

DETAILED DESCRIPTION OF THE PREFERRED EMBODIMENT

With reference to the appended drawings, a preferred embodiment of the present invention will be described below in detail.

Figure 1:
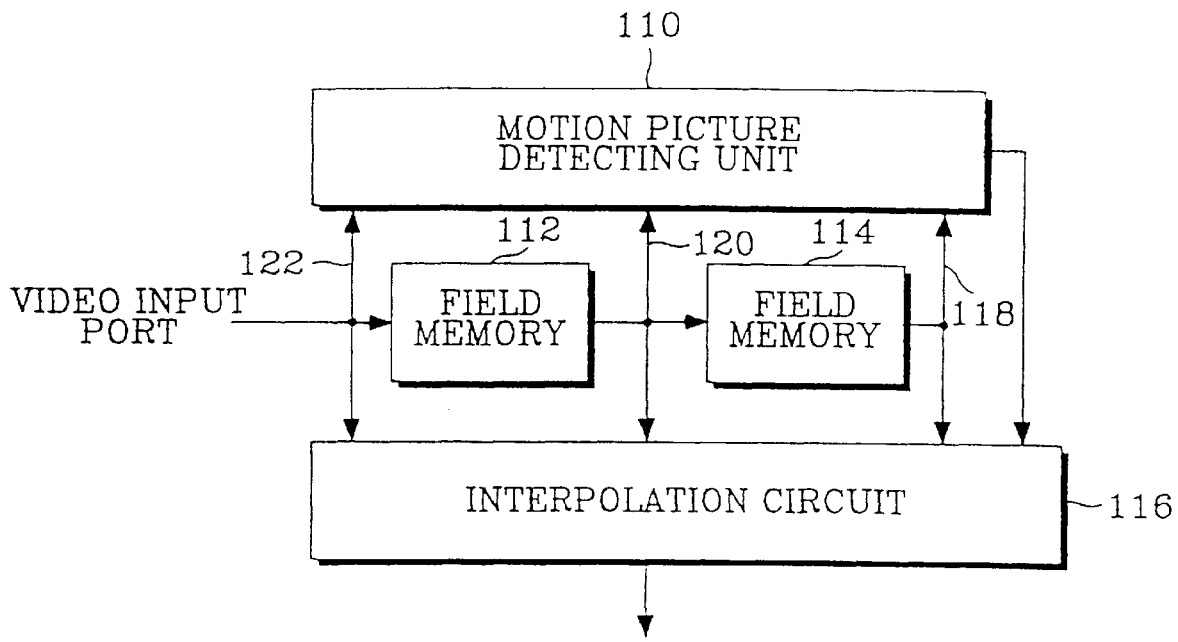
FIG. 1 is a block diagram of a general interlaced-progressive scanning converter.
Figure 2:
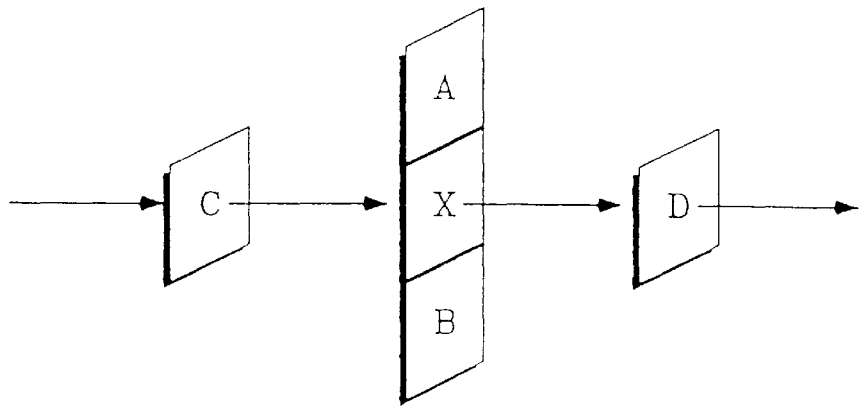
FIG. 2 shows the relationships of pixels which are generally used for interpolating the present pixel.

An interlaced-progressive scanning converter according to the present invention has the construction as shown in FIG. 1.

Figure 3:
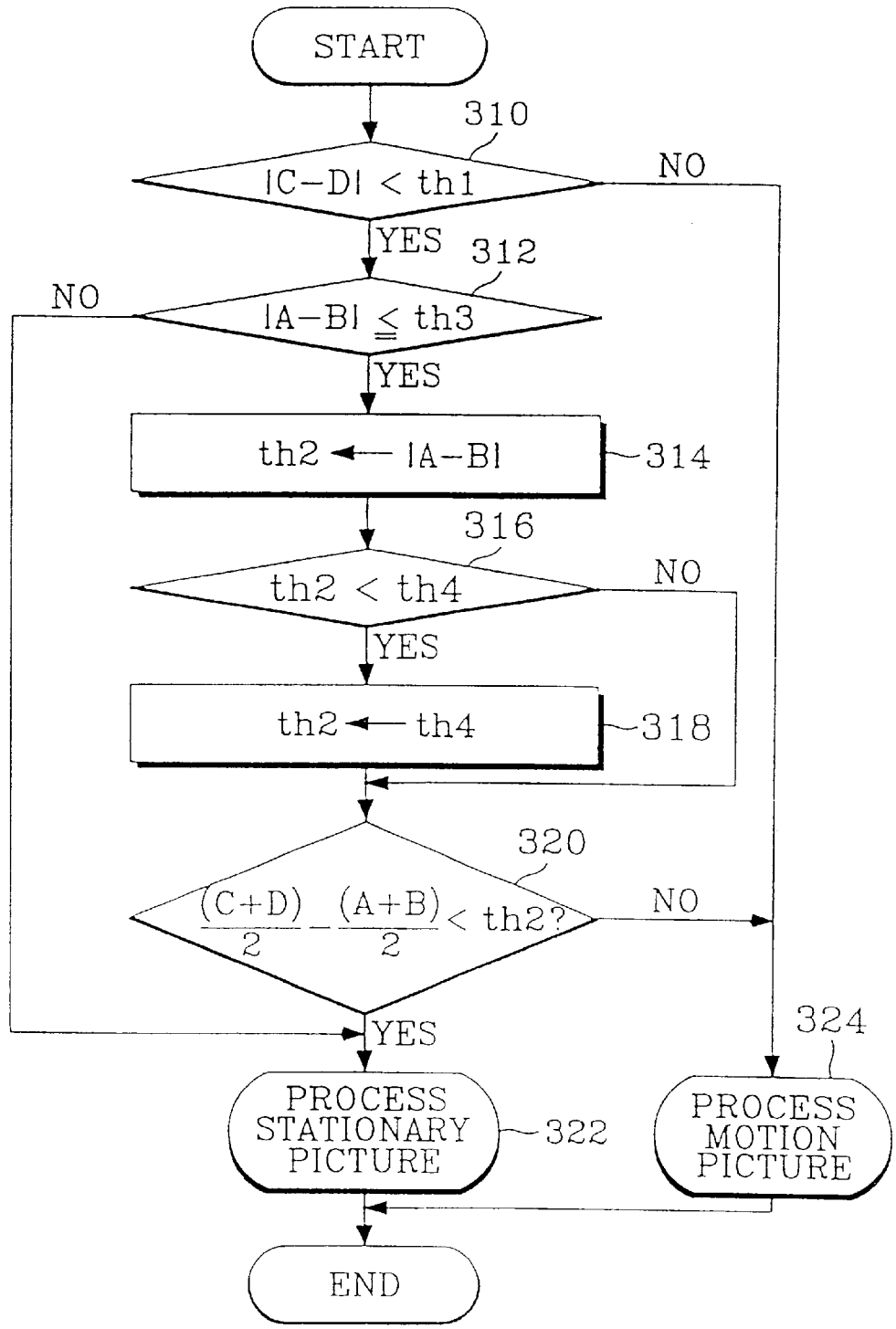
FIG. 3 is a flow chart for detecting a motion picture according to the present invention.

As shown in FIG. 3, a motion picture detecting unit 110 decides whether a difference between the pixel data C and D of preceding and succeeding fields, which is represented as |C−D|, is smaller than a decision coefficient th1 in step 310. The pixel data C of the preceding field is buffered by a field memory 114 and supplied through a line 118. The pixel data D of the succeeding field is input from a video input port and supplied through a line 122. The pixel data of the present field is buffered by a field memory 112 and supplied through a line 120.

In case that the difference between the pixel data C and D of the preceding and succeeding fields is not smaller than the decision coefficient th1, as decided in the step 310, the motion picture detecting unit 110 controls an interpolation circuit 116 in step 324 so as to interpolate the presently scanned picture data correspondingly to the motion picture. However, in case that the difference between the pixel data C and D of the preceding and succeeding fields is determined in step 310 to be smaller than the decision coefficient th1, the motion picture detecting unit 110 decides (in step 312) whether the difference between the pixels above and below the pixel to be interpolated, which is represented as |A−B|, is larger than a stationary coefficient th3 which is an established value. In case that the difference |A−B| is larger than or equal to the stationary coefficient th3 in the step 312, the picture is determined to have an abrupt vertical change. Thus, it is treated as a stationary picture for keeping the sharpness of the picture, so that the motion picture detecting unit 110 controls the interpolation circuit 116 so as to interpolate the presently scanned picture data (in step 322) as a stationary picture.

However, in the case that the difference is less than the stationary coefficient th3 in the step 312, the motion picture detecting unit 110 sets the value of the difference to be the value of a decision coefficient th2 (step 314). The value indicates the difference between the pixel data A and B above and below the pixel X to be interpolated. The step 314 is for detecting a picture with a slight movement as a motion picture by making the decision coefficient th2 small in case that the degree of correlation between A and B is high, in other words, if the value of |A−B| is small. In the case that the degree of correlation between A and B is low, that is, the value of |A−B| is large, the step 314 is for processing a picture as being a stationary picture even though the picture has a fairly large movement amount by making the decision coefficient th2 large.

The motion picture detecting unit 110 compares the decision coefficient th2 with a stationary coefficient th4. If the decision coefficient th2 is smaller than the stationary coefficient th4 in step 316, the motion picture detecting unit 110 sets the value of decision coefficient th2 to be the value of the stationary coefficient th4 in step 318. The purpose of performing the steps 316 and 318 is to prevent erroneous operation caused by noise by establishing the stationary coefficient th4 and making the decision coefficient th2 have a value over the predetermined value th4.

After the steps 316 and 318 are completed, the motion picture detecting unit 110 performs the conventional motion picture detecting process in step 320.

Other preferred embodiments can be realized if functions relate to the correlation between the pixel data A and B above and below the pixel X to be interpolated in the same field when the decision coefficient th2 is set in step 314. For example, a function of the form k|A−B| (k is an arbitrary integer), such as 2|A−B| and 3|A−B| may be used. Alternatively, a function of the form $|A-B|^k$ (k is an arbitrary integer), such as $|A-B|^2$ may be utilized.

As described above, the present invention can improve on obscurity of a picture at the border of an object scanned, improve decreased resolution in a high resolution spot patter, and decrease blurring of the object's motion when the background has a luminance which is hardly different from that of the object. This is done by changing the decision coefficient according to the correlation between the pixels above and below the pixel to be interpolated.

Therefore, it should be understood that the present invention is not limited to the particular embodiment disclosed herein as the best mode contemplated for carrying out the present invention, and that various changes and modifications may be made in the invention without departing from the spirit and scope thereof. Thus, the present invention is not limited to the specific embodiments described in this specification except as defined in the appended claims.

What is claimed is:

1. A method of detecting whether a picture is in motion, for use in an interlaced-progressive scanning converter for changing an interlaced-scanned signal into a progressive-scanned signal, the method comprising the steps of:

(a) detecting whether the picture is in motion by comparing a difference between pixel data of fields preceding and succeeding a field to be interpolated with a first decision coefficient, the first decision coefficient being preset at the time of the converter's manufacturing;

(b) setting a second decision coefficient according to the degree of correlation between data of pixels above and below a pixel to be interpolated in said field to be interpolated; and (c) detecting whether the picture is in motion by comparing a difference between temporal interpolation and spatial interpolation with said second decision coefficient.

2. The method according to claim 1, further comprising the step of;

(d) detecting whether the picture is stationary in the case that a difference between the data of pixels above and below said pixel to be interpolated is greater than a stationary coefficient.

3. The method according to claim 2, further comprising the step of;

(e) maintaining said second decision coefficient greater than the stationary coefficient.

4. The method according to claim 1, wherein, in said step (b), the second decision coefficient is set to have the value of an absolute value of the difference between said data of pixels above and below said pixel to be interpolated.

5. The method according to claim 1, wherein, in said step (b), the second decision coefficient is set to have the value of an absolute value of the difference between said data of pixels above and below said pixel to be interpolated, multiplied by a constant number.

6. The method according to claim 1, wherein, in said step (b), the second decision coefficient is set to have the value of the value obtained by squaring an absolute value of the difference between the data of pixels above and below the pixel to be interpolated.

7. The method according to claim 3, wherein said step (e) comprises the steps of:

comparing said second decision coefficient with said stationary coefficient; and setting said second decision coefficient to have the value of said stationary coefficient in the case that said second decision coefficient is smaller than said stationary coefficient.

* * * * *